US006967476B2

United States Patent
Block et al.

(10) Patent No.: US 6,967,476 B2
(45) Date of Patent: Nov. 22, 2005

(54) METHOD AND ASSEMBLY FOR DETERMINING RATIONAL SPEED WITH VARIABLE SWITCHING HYSTERESIS

(75) Inventors: Ruediger Block, Korntal-Muenchingen (DE); Christelle Andriot, Ludwigsburg (DE); Rasmus Rettig, Gerlingen (DE); Klaus Walter, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/507,047

(22) PCT Filed: Mar. 20, 2003

(86) PCT No.: PCT/DE03/00926

§ 371 (c)(1),
(2), (4) Date: Sep. 8, 2004

(87) PCT Pub. No.: WO03/098229

PCT Pub. Date: Nov. 27, 2003

(65) Prior Publication Data

US 2005/0122098 A1 Jun. 9, 2005

(30) Foreign Application Priority Data

May 18, 2002 (DE) ................. 102 22 205

(51) Int. Cl.⁷ ............................................... G01B 7/30
(52) U.S. Cl. ................. 324/207.25; 324/207.2
(58) Field of Search ................ 324/166, 173–174, 324/207.13, 207.2, 207.21, 207.22–207.26, 324/222–223, 244, 251; 123/612, 617; 73/514.16, 73/514.31

(56) References Cited

U.S. PATENT DOCUMENTS

| 5,101,155 A | 3/1992 | Oehler et al |
| 5,451,891 A | 9/1995 | Tanabe |
| 5,568,141 A | 10/1996 | Mori |
| 5,754,042 A * | 5/1998 | Schroeder et al. ...... 324/207.25 |
| 6,215,297 B1 | 4/2001 | Bleckmann et al |
| 6,346,808 B1 * | 2/2002 | Schroeder .............. 324/207.21 |
| 6,442,502 B1 | 8/2002 | Lohberg et al |
| 2001/0013775 A1 | 8/2001 | Blossfeld |

FOREIGN PATENT DOCUMENTS

DE 197 50 304 5/1999

* cited by examiner

Primary Examiner—Bot LeDynh
(74) Attorney, Agent, or Firm—Michael J. Striker

(57) ABSTRACT

A method for detecting the motion of an element relative to a sensor arrangement is proposed, wherein switching signals (1) are evaluated as a function of a pulse transmitter passing in front of the sensor, and a switching hysteresis (H) is adapted in the evaluation as a function of the values of the switching signal (1). When the element moves below a predetermined limiting value ($f_{Grenz}$), a relatively great switching hysteresis (Hyst0) is set, and when the limiting value ($f_{Grenz}$) is exceeded, a reduced switching hysteresis (H1) is set.

6 Claims, 2 Drawing Sheets

METHOD AND ASSEMBLY FOR DETERMINING RATIONAL SPEED WITH VARIABLE SWITCHING HYSTERESIS

The present invention relates to a method and an apparatus for detecting the motion of an element relative to a sensor arrangement, in particular for detecting the angle of rotation of a rotating element.

BACKGROUND OF THE INVENTION

Sensor arrangements of this type are already employed in different embodiments, in motor vehicles, for example. For example, with "Hall elements" as rotational speed sensors on the wheels for an antilock braking system (ABS), as rotational speed and phase sensors for engine management, or as steering-angle sensors for electronic stability systems, and for electronic power steering systems. These sensor arrangements, which are known from DE 197 50 304 A1, for example, typically emit digital signals, e.g., switching flanks, as a function of a trigger wheel rotating in front of the sensor.

Due to mechanical tolerances in particular, the most important requirements on these rotational speed sensors in an ABS and in engine and transmission systems include the greatest possible air gap and a high immunity to vibrations. A number of, at times, contradictory requirements are also placed on these sensor arrangements, whereby a highly sensitive sensor is also highly sensitive to excitation by the vibrations that interfere with the measured result. Full functionality should be achieved for very large air gaps, i.e., a highly sensitive sensor. At the same time, when air gaps are small, the aim should be to prevent the occurrence of faulty signals caused by vibrations when a sensor signal is high.

To minimize the sensitivity to vibrations of sensor arrangements of this type, a variable hysteresis is often used in conventional rotational speed sensors. In this case, the signal amplitudes must first be measured and the hysteresis is then adapted in a flexible manner. A large hysteresis is used for high input signals, and a correspondingly reduced hysteresis is selected for small input signals, i.e., the amplitude required for switching is increased when the air gap is small.

At the same time, the sensor is also required to be immune to vibrations, particularly when the trigger wheel is at a standstill; this works against high sensitivity and makes it necessary to realize a large switching hysteresis.

A further aim is for the realized sensor to be insensitive to short-term signal changes, in particular to a marked amplitude reduction during operation. A main disadvantage of this method with a flexible hysteresis is therefore the loss of immunity against air gap impacts during operation in particular, which can generate a considerable, short-term reduction of the signal amplitude of this very type. As a result of a previously increased hysteresis at the switching point of the sensor, an air gap impact of this type may result in a loss of signal and/or a signal breakdown.

Furthermore, the sensor need only be calibrated first for the method to be used with an adaptable hysteresis, since the signal amplitude is not known until after calibration. To correctly adjust the hysteresis, the sensor would first have to measure the signal amplitude, however. Since no measured values are available immediately after switching on, a starting value—typically the minimum—for the hysteresis must be selected in the sensor. At the same time, this also means that the sensor is very sensitive to vibrations in this state, however.

Moreover, due to an increased hysteresis resulting from magnetic stimulation (i.e., during rotation of the trigger wheel), the sensor also loses its robustness to air gap impacts, which can drastically reduce the signal amplitude over a few periods.

For example, the use of an adaptive hysteresis that depends on the signal amplitude is known from U.S. Pat. No. 5,451,891 A1. In this case, a coupling factor is determined as the quotient of the measured sensor amplitude and the frequency and, based on this coupling factor, the hysteresis is adjusted in proportion to the product of the coupling factor and the frequency. With this known method, it is possible only to compensate for the behavior of passive sensors which deliver a very small signal for low excitation frequencies and output a very high amplitude for high frequencies. The behavior of sensors that deliver a constant internal signal amplitude independent of the signal frequency cannot be improved, however.

SUMMARY OF THE INVENTION

The present invention relates to a further development of a method mentioned initially for detecting the motion of an element relative to a sensor arrangement, wherein switching signals are evaluated as a function of a pulse transmitter passing in front of the sensor, and a switching hysteresis is adapted in the evaluation as a function of the values of the switching signal.

In advantageous fashion, according to the present invention, when the element moves below a predetermined limiting value, a relatively large switching hysteresis is set, and a reduced switching hysteresis is set when the limiting value is exceeded. The core of the invention therefore lies in the implementation of a frequency-dependent hysteresis that may be supplementable with an amplitude-dependent hysteresis. The predetermined limiting value is preferably a limiting frequency for the measured switching signals, which are evaluated as switching signals from a trigger wheel, as pulse transmitter, in particular during detection of the motion of a rotatable element, e.g., a rotational speed sensor. It can therefore be achieved in a simple manner that a high immunity to vibration, i.e., no additional vibration pulses are produced, exists below the limiting frequency essentially in the standstill state, thereby ensuring great robustness to air gap impacts above this limiting frequency, i.e., no pulses are missing. In addition to the evaluation of the signal frequency relative to the limiting frequency, any type of standstill detection can be used to achieve the activation of the relatively large starting hysteresis.

According to an advantageous embodiment, a previously measured amplitude of the switching signal can be used to determine the relatively large switching hysteresis, as starting hysteresis. According to another advantageous embodiment, a fixed value can be used for the relatively large switching hysteresis, as starting hysteresis, and/or the reduced switching hysteresis after the limiting value is exceeded and/or after the standstill has ended.

BRIEF DESCRIPTION OF THE DRAWINGS

An exemplary embodiment of the present invention for detecting the motion of an element relative to a sensor arrangement is explained with reference to the drawing.

DETAILED DESCRIPTION OF THE PREFERRED EMBODIMENTS

Figure 1:
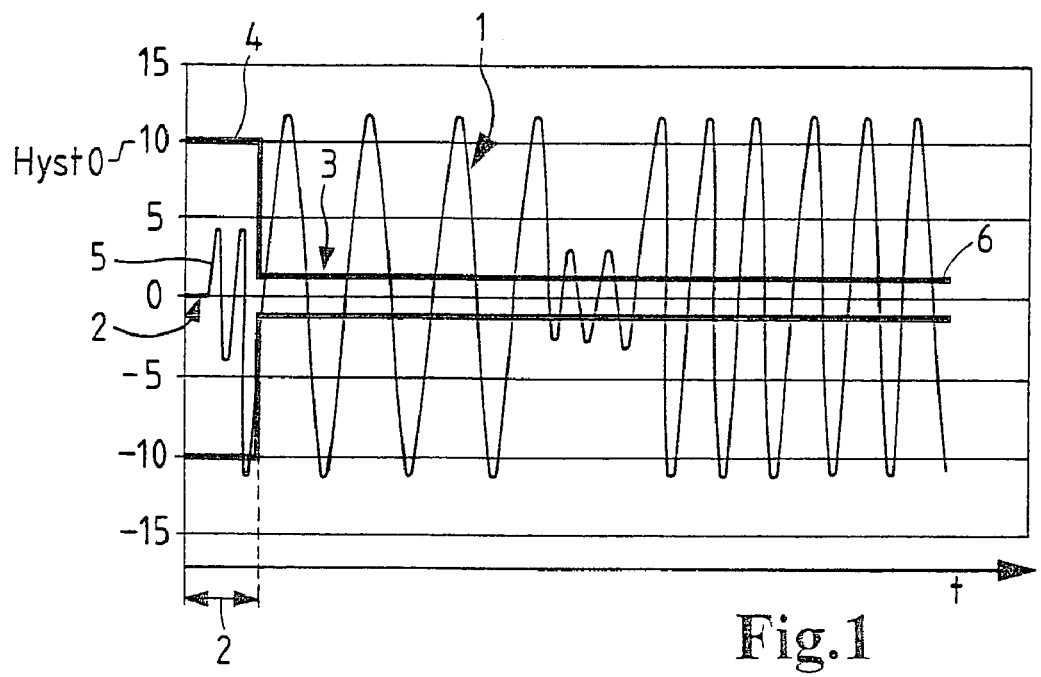
FIG. 1 shows a diagram of the shape of the curve of a sensor signal from the sensor arrangement and a switching hysteresis over time, whereby the sensor signal is formed of switching signals during the standstill and the rotational motion of a trigger wheel.

FIG. 1 shows a diagram of course 1 of a sensor signal of the sensor arrangement over time t, which is determined here in the detection of the rotational motion of a trigger wheel as known in principle from the related art, e.g., to generate pulses for predetermined angles of rotation. In the left part of the diagram according to FIG. 1, a range 2 is defined as the standstill of the trigger wheel, which is not shown here. This range 2 can be defined as the range below a predetermined limiting value $f_{Grenz}$, as indicated in parallel in FIG. 2.

Figure 2:
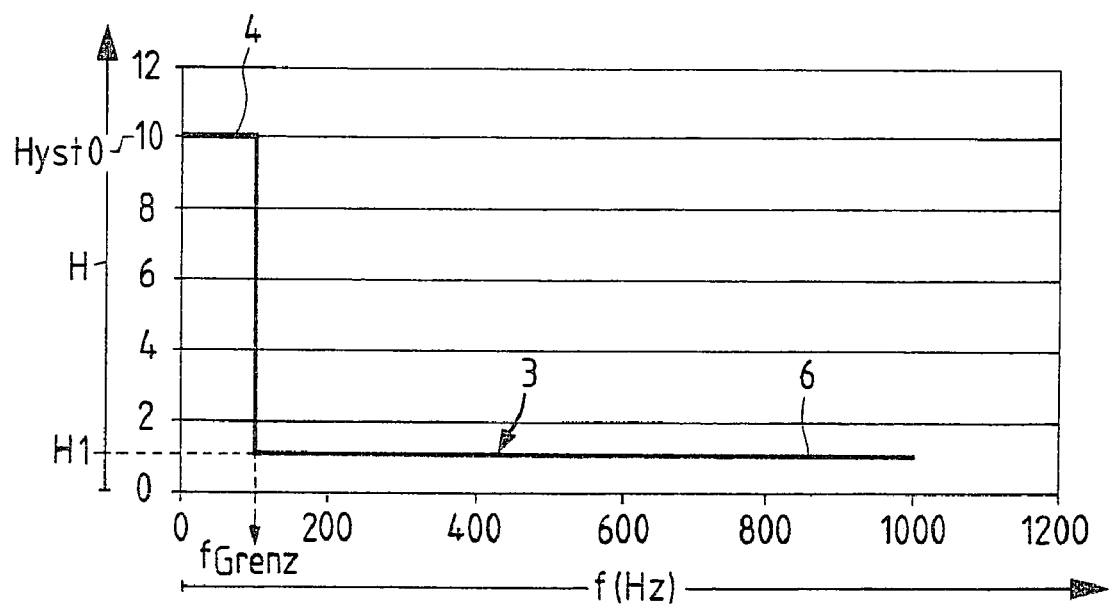
FIG. 2 shows a diagram of the course of the switching hysteresis as a function of frequency during evaluation of the sensor signal.

FIG. 2 shows course 3 of a switching hysteresis H as a function of frequency f in the evaluation of sensor signal 1 according to FIG. 1. A relatively large switching hysteresis 4 is selected in region 2 as Hyst0, so that vibrations 5 do not result in a few signals that falsify the measured result.

After leaving standstill range 2 according to FIG. 1 and/or after limiting value $f_{Grenz}$ is exceeded according to FIG. 2, a reduced switching hysteresis H1 is set in range 6. FIG. 2 therefore shows a fixed hysteresis H=Hyst0 for a signal frequency $f<f_{Grenz}$ and a fixed hysteresis H=H1 for $f>f_{Grenz}$.

Figure 3:
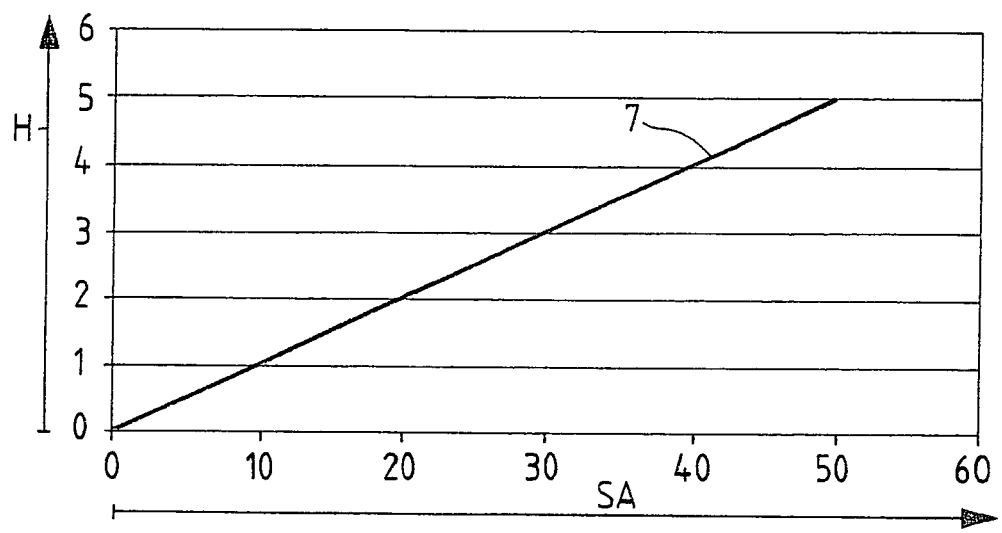
FIG. 3 shows a diagram of the course of a switching hysteresis that is dependent on the amplitude of the sensor signal.

FIG. 3 shows a combination of fixed hysteresis H according to FIG. 2 with an amplitude-dependent hysteresis H. A course 7 of hysteresis H plotted against signal amplitude SA is shown. Fixed hysteresis H=Hyst0 is adapted here based on a previously measured signal amplitude SA, i.e., fixed hysteresis Hyst0 is a function of amplitude. If it was not possible to measure signal amplitude SA in advance, e.g., directly after the sensor arrangement was switched on, this can take place via the selection of a preset value (a default value).

Figure 4:
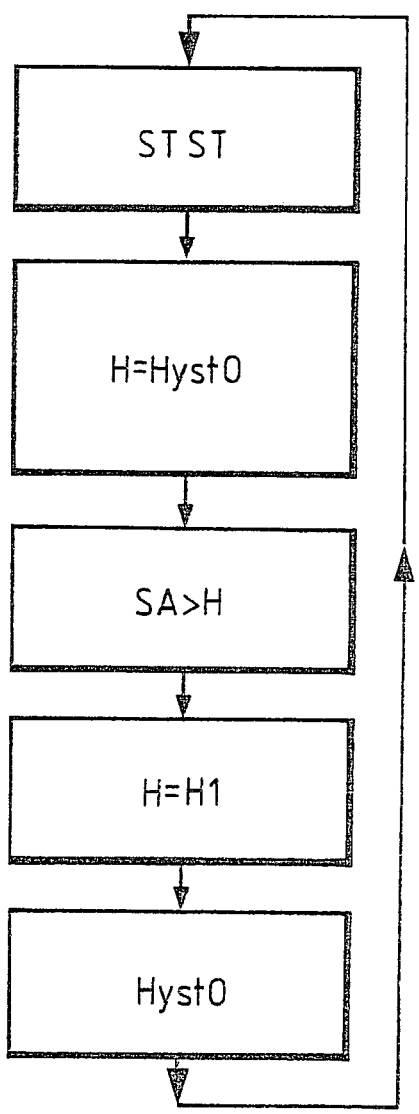
FIG. 4 shows a flow chart for determining the switching hysteresis.

FIG. 4 shows a flow chart depicting the mode of operation of a sensor according to the present invention, including the determination of switching hysteresis H explained with reference to FIGS. 1 through 3. Starting with the detection of a standstill STST, e.g., $f<f_{Grenz}$, the large switching hysteresis Hyst0 is first set. Then, motion of the trigger wheel is detected via the measured signal amplitude SA (refer to position 1 in FIG. 1), and switching hysteresis H is then reduced to value H1. A new value for Hyst0 can be determined from signal amplitude SA which is then measured, and said new value is used when standstill occurs again.

What is claimed is:

1. A method for detecting the motion of an element relative to a sensor arrangement, wherein
    switching signals (1) are evaluated as a function of a pulse transmitter passing in front of the sensor, and
    a switching hysteresis (H) is adapted in the evaluation as a function of the values of the switching signal (1), wherein
    when the element moves below a predetermined limiting value ($f_{Grenz}$), a relatively great switching hysteresis (Hyst0) is set, and when the limiting value ($f_{Grenz}$) is exceeded, a reduced switching hysteresis (H1) is set, and
    wherein the predetermined limiting value is a limiting frequency ($f_{Grenz}$) for the measured switching signals (1).

2. The method as recited in claim 1, wherein to detect the motion of a rotatable element, the switching signals (1) of a trigger wheel, as the pulse transmitter, are evaluated.

3. The method as recited in claim 1, wherein a previously measured amplitude of the switching signal (1) is used to determine the relatively great switching hysteresis, as the starting hysteresis (Hyst0).

4. The method as recited in claim 1, wherein a fixed value is used for the relatively great switching hysteresis, as the starting hysteresis (Hyst0), and/or the reduced switching hysteresis (H1) after the limiting value ($f_{Grenz}$) is exceeded.

5. A sensor arrangement for performing the method according to claim 1, wherein the sensor arrangement has contactless sensors with Hall elements or magnetoresistive elements.

6. The sensor arrangement as recited in claim 5, wherein the sensor arrangement is used as a rotational speed sensor in a motor vehicle.

* * * * *